United States Patent [19]

Bernard et al.

[11] 4,048,450

[45] Sept. 13, 1977

[54] TRUNK CIRCUIT TRAFFIC ANALYZER

[76] Inventors: Jean-Michel Bernard, 10, rue du Viaduc, 92130 Issy-les-Moulineaux; Lucien Labboz, 25, avenue de Gaulle, 92190 Meudon; Daniel Vesque, 15 ter, rue Roger Salengro, 92120 Montrouge, all of France

[21] Appl. No.: 671,668

[22] Filed: Mar. 29, 1976

Related U.S. Application Data

[63] Continuation-in-part of Ser. No. 518,102, Oct. 25, 1974, abandoned.

[51] Int. Cl.² ........................................... H04M 7/06
[52] U.S. Cl. ............................... 179/18 EB; 179/8 R; 179/9; 179/84 VF
[58] Field of Search .......... 179/18 AH, 18 EB, 16 A, 179/16 AA, 16 EC, 84 VF, 18 AG, 8 A, 7 R, 8 R, 9

[56] References Cited

U.S. PATENT DOCUMENTS

| | | |
|---|---|---|
| 3,376,391 | 4/1968 | Finkhauser et al. ............. 179/16 EC |
| 3,431,365 | 3/1969 | Siegel et al. ..................... 179/18 EB |
| 3,609,249 | 9/1971 | Pinede ............................. 179/84 VF |
| 3,821,484 | 6/1974 | Sternung et al. ............... 179/84 VF |
| 3,830,984 | 8/1974 | Gloeckler ........................ 179/18 EB |

Primary Examiner—William C. Cooper
Assistant Examiner—Randall P. Myers

[57] ABSTRACT

Analyzer for monitoring the traffic of a group of trunks conveying decimal code signalling and dialling impulses and multifrequency code signalling and dialling signals. It comprises multifrequency signalling receivers in a number smaller than the trunks of the group which are connected to the trunks only during the time when the same convey multifrequency signals. As this time is variable according to the phase succession of the telephone call, means are provided for defining the last decimal code impulse before the beginning of multifrequency signalling which serves for connecting a multifrequency signalling receiver to the trunk and the last multifrequency code signal according to the call phase succession which serves for disconnecting the multifrequency signalling receiver from the trunk.

3 Claims, 6 Drawing Figures

TRUNK CIRCUIT TRAFFIC ANALYZER

CROSS REFERENCE TO RELATED APPLICATIONS

The present application is a continuation-in-part of Application Ser. No. 518,102 now abandoned.

BACKGROUND OF THE INVENTION

1. Field of the Invention

The present invention relates to a traffic analyzer for trunk or toll circuit switching facilities which analyzes both pulse code signalling, often referred to as decimal code because call dialing is transmitted in decimal code, and multifrequency code signalling.

2. Description of the Prior Art

It is known that the latter signalling code offers two advantages:

it is quicker than the pulse decimal code; in fact, it is a parallel code and not a series code;

it can give much more data on various call routing steps and this is important for traffic monitoring.

Reception of multifrequency (MF) signalling requires multifrequency signalling receivers or siccintly multifrequency receivers (MFR) which are complex and costly. Due to the complexity and cost of such multifrequency receivers, it would be quite difficult to assign a multifrequency receiver to each trunk circuit to be monitored, and a feature of the present invention is that the number of multifrequency receivers is inferior to that of the monitored trunk circuits. Therefore, it becomes necessary that multifrequency receivers be connected to and disconnected from trunk circuits at proper instants, i.e. connected as soon as multifrequency signalling starts, and disconnected as soon as such multifrequency signalling ceases so as multifrequency receivers be released for availability to other trunk circuits.

The determination of the time during which a multifrequency receiver should remain connected varies because the number of MF digits of a multifrequency signalling call also varies and the multifrequency receiver can only be disconnected after the last MF digit has been received. However, this last digit can be deduced only from the sequencing or catenation of successive phases of the multifrequency code and from the combinations of code used in such phases.

SUMMARY OF THE INVENTION

The main object of the present invention is to develop a traffic analyzer for trunk circuits that is able to analyse decimal code signalling as well as multifrequency code signalling.

Another object of the invention is to determine the last multifrequency signalling digit, owing to the sequencing or catenation of multifrequency code phases and of combinations of code used in these phases.

In compliance with this invention, the trunk circuit traffic analyzer includes means for sampling cyclically and in sequence decimal code pulses transmitted by said trunk circuits, means for inferring from the number of samples the duration and number of these pulses, as well as telephone call phases corresponding to said pulse duration and number, a plurality of multifrequency signalling receivers detecting multifrequency code signals transmitted by said trunk circuits and recording the multifrequency digits corresponding thereto, and means for deriving telephone call phases corresponding to said multifrequency digits, and it is characterized in that in addition it includes means for deriving from the sequencing or catenation of said multifrequency digits, the final multifrequency signalling digit, means controlled by the means for inferring the duration and number of the decimal code pulses for connecting a multifrequency signalling receiver to a trunk circuit, and means controlled by the means for deriving the final multifrequency signalling digit for disconnecting a multifrequency signalling receiver from a trunk circuit.

In addition, the unit includes means for recording the various call phases as they correspond to decimal code pulse number and duration and to multifrequency code digits, and the exact instants when such phases occur.

More precisely, the information provided by the analyzer is the following:

specific communication circuit number;

ABPQMCDU call number;

specific timing data on communication or call, namely line seizing time, dialing tone sending time, dialing termination time, called subscriber's reply time, call termination time.

BRIEF DESCRIPTION OF THE DRAWING

Other characteristics and advantages offered by the analyzer of the invention will emerge upon reading the detailed description which is to follow, and upon a perusal of the accompanying drawings in which.

DESCRIPTION OF THE PREFERRED EMBODIMENTS

Figure 1:
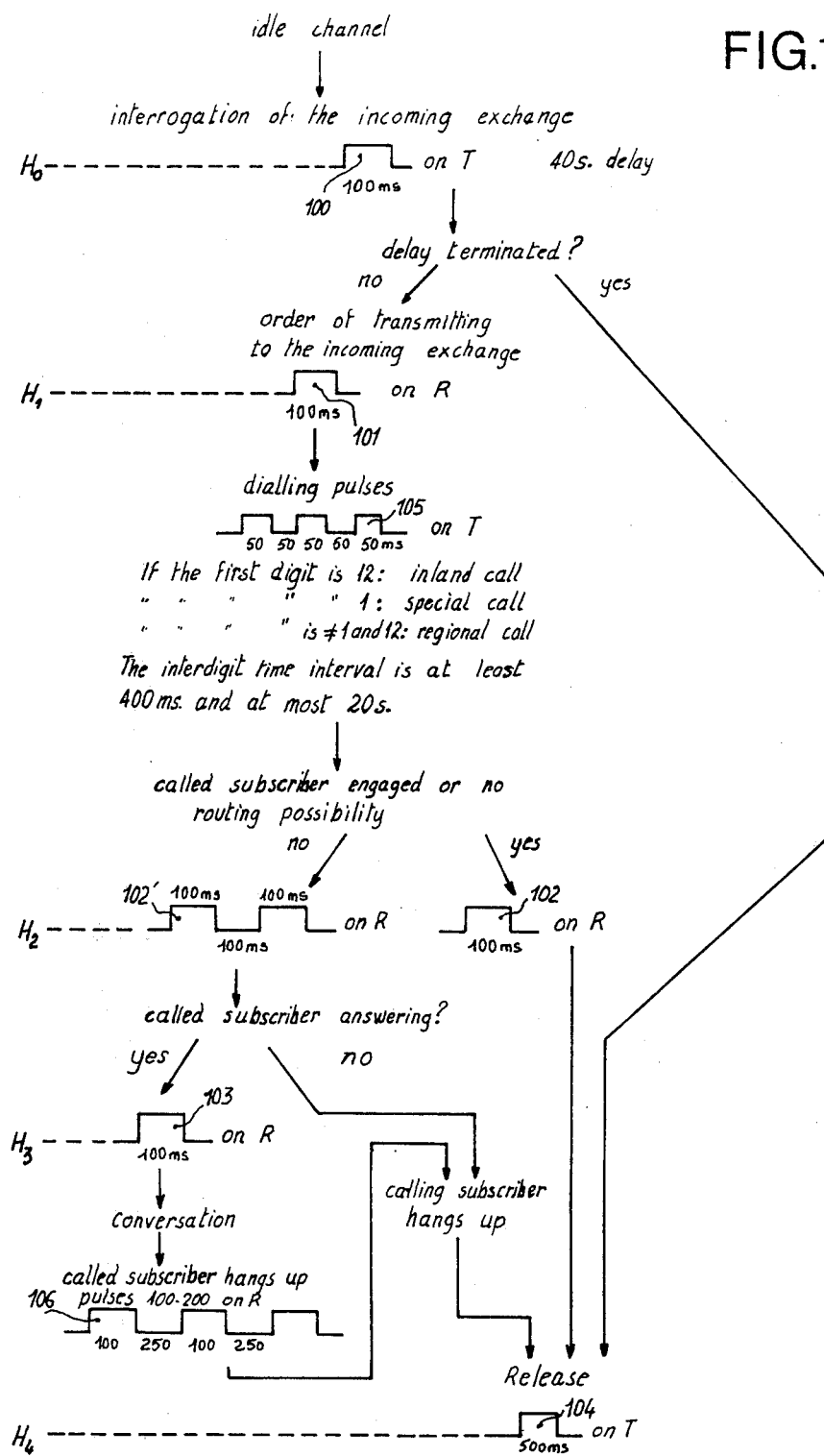
FIG. 1 is a schematic diagram of the various phases related to the establishment and breaking of a decimal code signalling call.

FIG. 1, related to decimal pulse code dialing and signalling call, shows that the originating or calling exchange dispatches to the terminating or called exchange upon making a call a 100 ms seizing impulse, 100, over its transmission wire T, and that, in the case where the terminating exchange accepts the call, the originating exchange receives from the latter a 100 ms proceed-to-send impulse, 101, on its reception wire R. Then, the originating exchange dispatches the decimal code number over wire T as a pulse train of 50 ms each, at each 100 ms recurrence period; this pulse train is designated by 105.

If the called party is busy or if it is impossible to go through, the originating exchange receives a 100 ms pulse, 102, over wire R, and when the calling party hangs up, it transmits over wire T a release pulse 104 of 500 ms.

If the called party line is clear, the originating exchange receives the two pulses 102' of 100 ms over wire R, each split by a 100 ms interval. Whenever the called party picks up the phone, a third pulse, 103, of 100 ms after which the conversation begins, is received by the originating exchange.

When the called party hangs up, a train 106 of pulses of 100 ms, split by 250 ms intervals is received over wire R. Finally, when the calling party hangs up, the originating exchange transmits a pulse, 104, as already indicated.

The traffic analyzer detects pulses or pulse trains 100, 101, 102, 102', 103, 104, 105 and 106, and records timing data, namely instant $H_0$ of pulse 100, instant $H_1$ of pulse 101, instant hour $H_2$ of pulse 102 or two pulses 102', instant $H_3$ of pulse 103 and instant $H_4$ of pulse 104.

Figure 2:
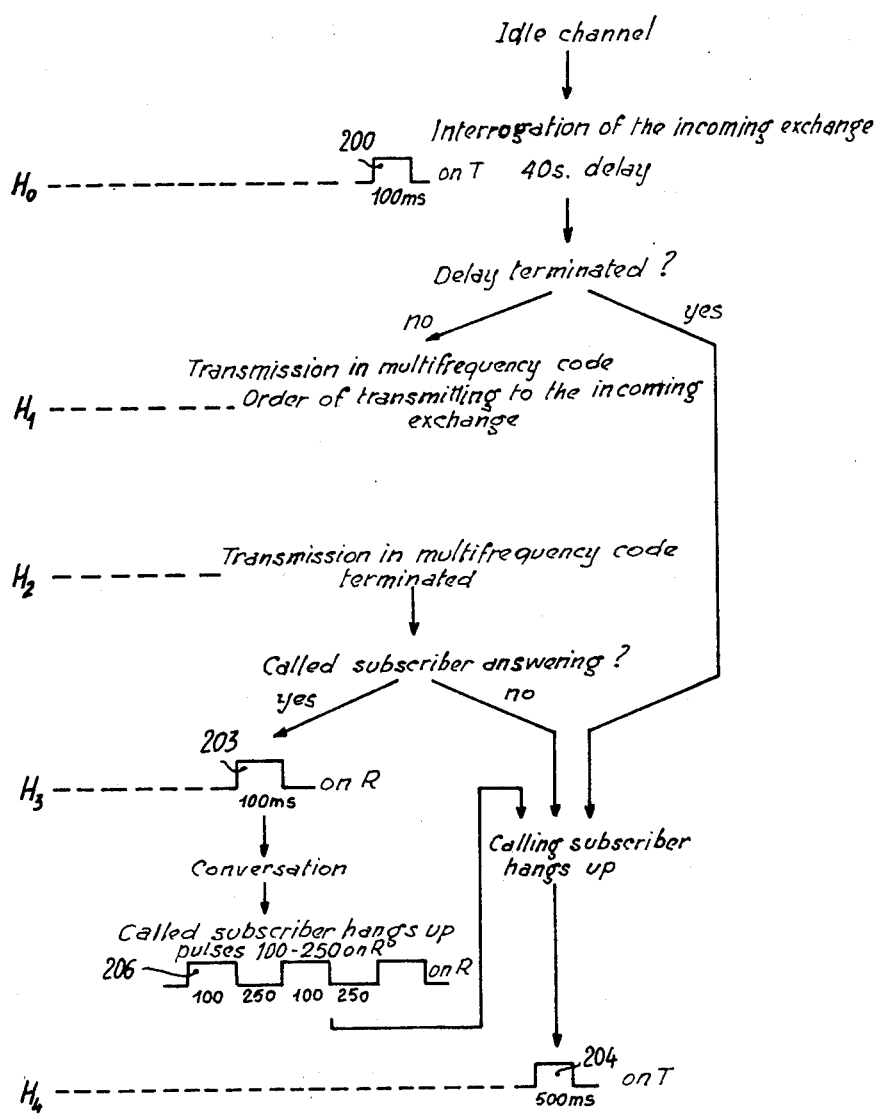
FIGS. 2 and 3 are general and detailed diagram representations, respectively depicting the various multifrequency code signalling phases.
Figure 3:
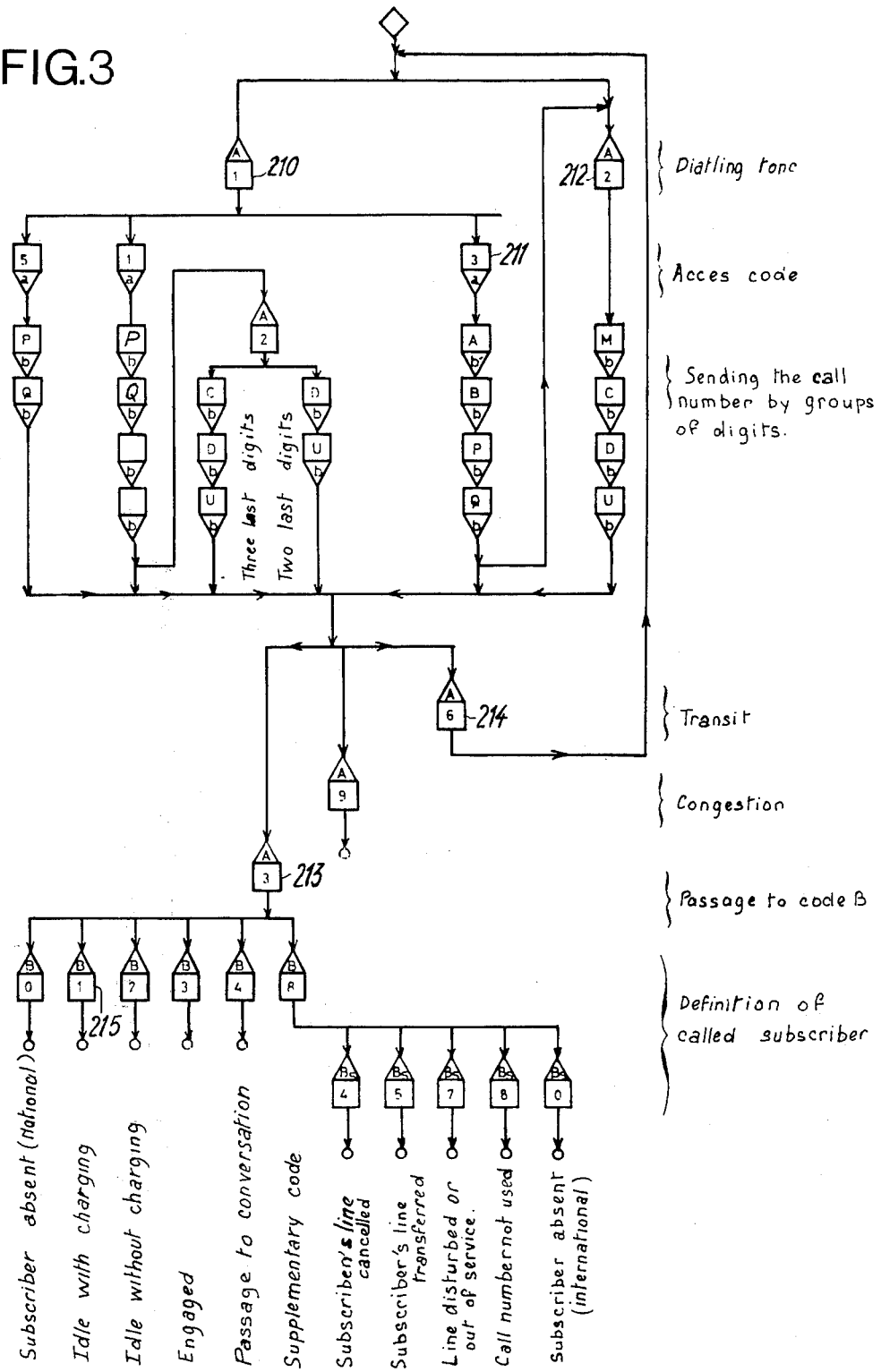

FIGS. 2 and 3 relate to a multifrequency 2-out-6 code signalling and numbering call, and to Table I. Five frequencies f0, f1, f2, f4 and f7 which are the high and low tone frequencies well known, are generally used for the national traffic and a complementary frequency f11 which combines with the five other frequencies is used for the international traffic;

Table I imparts the significant meaning of each couple of freqencies, on the one hand, whenever it is considered from the point of view of numbering, and to the other hand, whenever it is considered from the point of view of signalling. One differentiates between signals *a* of the acces code transmitted from the originating exchange, signals *b* of the dialing code also transmitted by the originating exchange, signals A of the selection code transmitted by the terminating exchange, and signals B of the called party condition code also transmitted by the terminating exchange. Frequency couples can also belong to codes *c* and C related, respectively, to the calling party condition code and to the identification of the calling subscriber. These last two codes are not used in the embodiment in accordance with the invention and are not shown in Table I.

and B can designate at the same time the types of codes and combinations of such codes; they designate a type of code when they are shown in a triangle and a combination of the numbering code when they are placed in a square.

With two instances, the different steps in the establishment or breaking of a MF code call related to FIGS. 2 and 3 will be exemplified, FIG. 2 showing mainly the signalling in a call processed in decimal pulse code and FIG. 3 showing the MF signalling.

The originating exchange dispatches to the terminating exchange a 100 ms seizing impulse, 200, on its transmission wire T (FIG. 2) at the start of call dialing. Then a pulse train, by example, of 100 ms each, at each 150 ms recurrence period (not shown), is dispatched by the originating exchange on transmission wire T. This pulse train indicates the signalling code change to a multifrequency code. Thus a multifrequency signal exchange takes place after such pulse train.

When the called party picks up his telephone set, an impulse 203 of 100 ms after which the conversation begins, is received on the reception wire R by the originating exchange. When the called party hangs up, a train 206 of pulses of 100 ms separated by 250 ms intervals is received on wire R. Lastly, when the calling party hangs up, the originating exchange transmits a release impulse 204 of 500 ms on wire T.

In the case of a call directly transmitted to the terminating exchange without intermediate exchange (direct route) and after dispatch of impulse 200 by the originat-

TABLE I

MULTIFREQUENCY SIGNAL CODES

| COMBINATION (2 out of 5) | FREQUENCIES (Hz) | ACCESS CODES a | | NUMBERING CODE b | | A CODE (Selection Code) | | B CODE (Called party condition code) | |
|---|---|---|---|---|---|---|---|---|---|
| f0 + f1 | 700 + 900 | a1 | regional | b1 | Digit 1 | A1 | Access signal and 2 or 4 first digit dispatch | B1 | Called party free with taxation |
| f0 + f2 | 700 + 1100 | a2 | | b2 | Digit 2 | A2 | Dispatch of last digits | B2 | Called party free without taxation |
| f1 + f2 | 900 + 1100 | a3 | national | b3 | Digit 3 | A3 | Switchover to Code B | B3 | Called party busy |
| f0 + f4 | 700 + 1300 | a4 | | b4 | Digit 4 | A4 | Switchover to Code C | B4 | Talk mode |
| f1 + f4 | 900 + 1300 | a5 | 2 digit call | b5 | Digit 5 | A5 | Calling party category dispatch | B5 | |
| f2 + f4 | 1100 + 1300 | a6 | | b6 | Digit 6 | A6 | Normal transit | B6 | |
| f0 + f7 | 700 + 1500 | a7 | | b7 | Digit 7 | A7 | | B7 | |
| f1 + f7 | 900 + 1500 | aB | | b8 | Digit 8 | A8 | | B8 | Switchover to supplementary Code |
| f2 + f7 | 1100 + 1500 | a9 | Internat'l semi-auto | b9 | Digit 9 | A9 | Busy | B9 | |
| f4 + f7 | 1300 + 1500 | a0 | Internat'l automatic | b0 | Digit 0 | A0 | | B0 | No reply from subscriber |
| Complementary Code (International Traffic) | | | | | | | | | |
| f0 + f11 | 700 + 1700 | a11 | | b11 | Code 11 operator | | | | |
| f1 + f11 | 900 + 1700 | a12 | | b12 | Code 12 operator | | | | |
| f2 + f11 | 1100 + 1700 | a13 | | b13 | Maintenance equipment | | | | |
| f4 + f11 | 1300 + 1700 | a14 | | b14 | | | | | |
| f7 + f11 | 1500 + 1700 | a15 | | b15 | End of numbering | | | | |

FIGS. 2 and 3 are schematic diagrams depicting the connection and disconnection of a call in MF code. Each MF signal dispatch or receipt is shown in FIG. 3 by a square abutting a triangle. In the triangle is the type of Code *a, b*, A, B, and in the square is shown the code combination used. In the case of numbering code *b*, the combinations used are multifrequency combinations corresponding to the decimal digits of the ABPQM-CDU call number of the called subscriber. The letters A ing exchange, the terminating exchange replies with proceed-to-end signal A1 (210; 700+900 Hz). The originating exchange then emits the access code $a_1$, $a_3$, or $a_5$, for instance $a_3$ (211; 900+1100 Hz) when this is a national call, then the prefix ABPQ of the called subscriber (signal of code *b*). The terminating exchange replies by a signal A2 (212; 700+1100 Hz) to request the dispatch of the 4 last digits MCDU of the called subscriber's local number. The originating exchange then dispatches these 4 last digits (signals of code b). The terminating exchange replies by A9 (busy) or A3 (switchover to code B). We will herein assume that the reply is A3 (213; 900+1100 Hz) and that the called subscriber is free and that the call must be taxed. The terminating exchange then transmits the signal B1 (215; 700+900 Hz).

If the call does not directly reach the terminating exchange (indirect route), the various steps are identical, up to dispatch by the originating exchange of the prefix ABPQ. These 4 digits are analyzed by an intermediate exchange which is a transit exchange and sees that the call is not for it. Instead of sending the signal A2 (212), it sends the signal A6 (214). The originating exchange takes cognizance of A6 and restarts dispatching toward the second terminating exchange the pertinent signals that it had just sent to the intermediate exchange.

There are many other MF code call configurations than those given above. They emerge from an understanding of the diagram of FIG. 3 and the manner with which such diagram can be put to use.

Instants $H_0$, $H_3$ and $H_4$ are derived as in the case of decimal pulse code from impulses 200, 203, 204. Instants $H_1$ and $H_2$ derive from MF signals, $H_1$ from the dialing tone sending signal A2 (212) and $H_2$ from the MF signalling exchange end.

Now, how to determine the instant $H_2$ of the end of MF signalling between exchanges which is the instant for disconnecting the multifrequency receiver is explained below in relation to FIG. 3.

As was said in the foreword, the sending of any "multifrequency" digit $n$ in a given code Co defines the awaited following code Co' and the number N of digits in code Co'.

Moreover, digits for initiating the multifrequency signalling are A1 or A2, and multifrequency signalling end digits are A9, B0, B1, B2, B3, B4, Bs4, Bs5, Bs7, Bs8, Bs0.

The following Table II gives for each code Co (A, B, a, b, Bs) and each digit $n$, the awaited code Co' and the number of digits N in the latter code.

TABLE II

| Co | n | Good code | Co' | N |
|---|---|---|---|---|
|  | 0 | no | x | x |
|  | 1 | yes | a | 1 |
|  | 2 | yes | b | 2, 3 or 4 |
|  | 3 | yes | B | 1 |
| A | 4 | no | x | x |
|  | 5 | no | x | x |
|  | 6 | yes | A | 1 |
|  | 7 | no | x | x |
|  | 8 | no | x | x |
|  | 9 | yes | nothing | 0 |
| B | 0,1,2,3,4, 5,6,7,9 | yes | nothing | 0 |
|  |  | no | x | x |
|  | 8 | yes | Bs | 1 |
|  | 0,2,4,6,7,8,9 | no | x | x |
| a | 1 | yes | b | 4 |
|  | 3 | yes | b | 4 |
|  | 5 | yes | b | 2 |
| b | all values | yes | b | 1, 2 or 3 |
|  |  | yes | A | 1 |
| Bs | 1,2,3,6,9 | no | x | x |
|  | 4,5,7,8,0 | yes | nothing | 0 |

Some combinations of specific codes are not used. If they are nevertheless received by the analyzer, it will react as if the code is faulty (a "no" indication in the "Good code" column).

Figure 4:
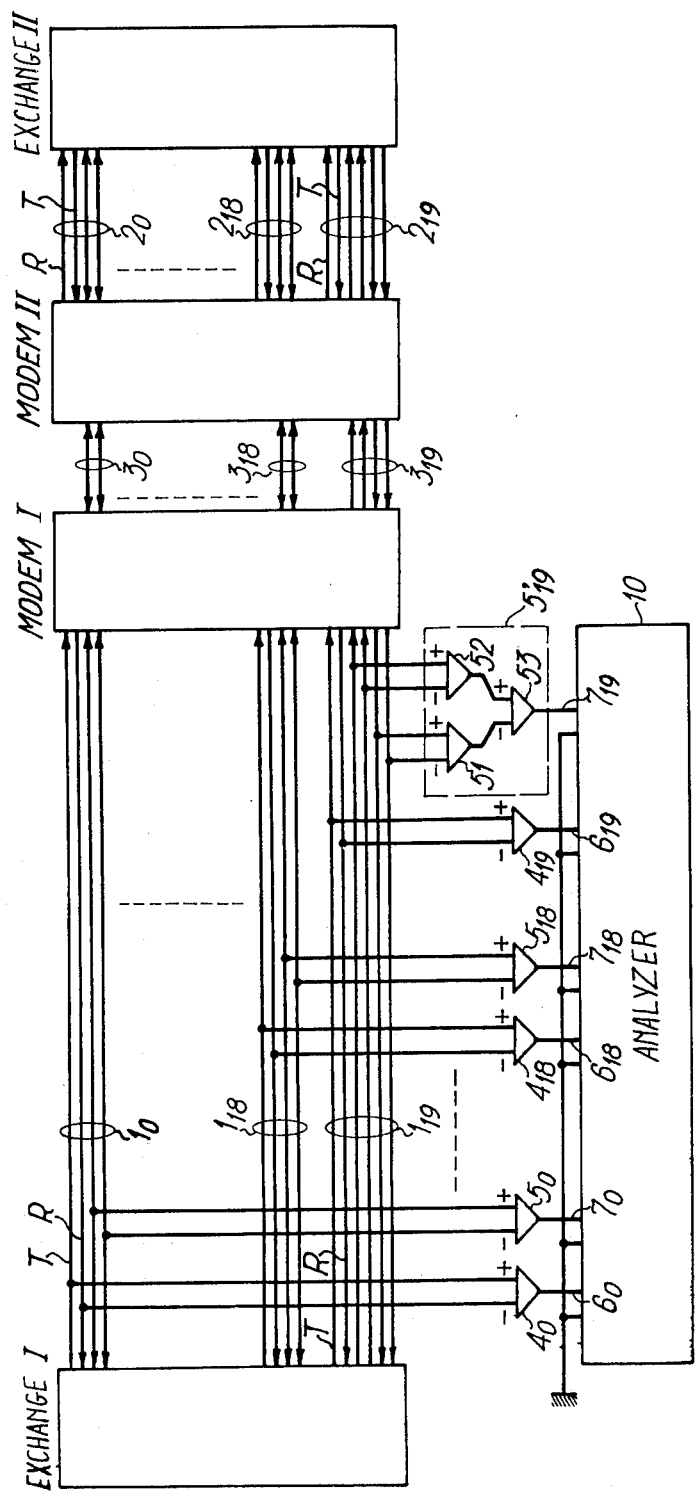
FIG. 4 represents the method of connecting the trunk call traffic analyzer to trunk circuits to monitor.

FIG. 4 represents the first and last two of twenty "outgoing" trunk circuits $1_0$ to $1_{19}$ and of twenty "incoming" trunk circuits $2_0$ to $2_{19}$ respectively linked to an originating or calling exchange I and a terminating or called exchange II. The trunk circuits $1_0$ to $1_{18}$ and $2_0$ to $2_{18}$ are two-wire type circuits and the two-wires of these circuits provide forward or transmission and backward or reception speech path and multifrequency signalling. The trunk circuits $1_{19}$ and $2_{19}$ are four-wire type circuits and the two-wire pairs of these circuits provide one pair for the forward speech path and multifrequency signalling and the other pair for the backward speech path and multifrequency signalling. These trunk circuits $1_0$ to $1_{19}$ and $2_0$ to $2_{19}$ include also each a forward (or transmission) pulse code signalling wire T and a backward (or reception) pulse code signalling wire R. The signalling pulses transmitted over wires T and R are transferred to the line wires of the trunk circuits $3_0$ to $3_{19}$, in modems I and II. These modems can also, as it is well known, transpose individual circuits $3_0$ to $3_{19}$ in frequency multiplexed or time multiplexed channels.

The analyzer 10 in accordance with the invention is linked to wires T and R, but also to the line wires of the twenty trunks by means of "symmetrical/asymmetrical" access circuits $4_0$ to $4_{19}$ and $5_0$ to $5_{18}$, converting the potential difference between two wires into a potential difference between a single wire and ground, and $5_{19}'$ which converts a difference between two potential differences between two wires into a potential difference between a single wire and ground. Circuits $4_0$ to $4_{19}$ and $5_0$ to $5_{18}$ represent an operational amplifier while circuit $5_{19}'$ is represented by three operational amplifiers 51, 52 and 53. Output wires $6_0$ to $6_{19}$ (decimal code signalling) and output wires $7_0$ to $7_{19}$ (MF code signalling) are linked to the inputs of the trunk traffic analyzer 10.

Figure 5:
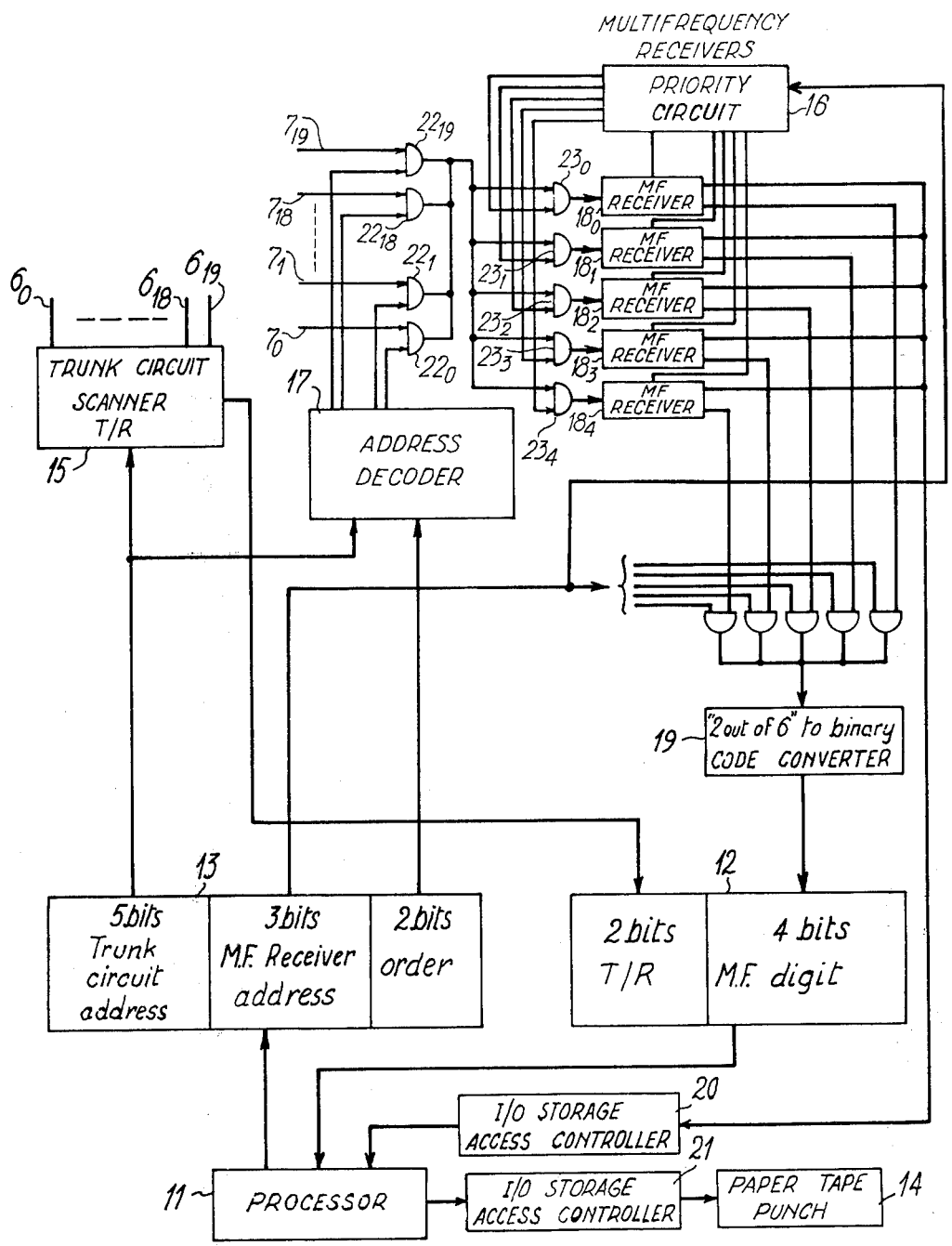
FIG. 5 is a block diagram of the traffic analyzer of the invention.

FIG. 5 shows the trunk traffic analyzer. It includes a processor 11 linked to an input register 12, an output register 13, and a digital output device 14, such as paper-type punch.

Wires $6_0$ to $6_{19}$ are scanned by a trunk circuit scanner 15 receiving from processor 11, via output register 13, the addresses of the trunk circuits to be scanned and sending to processor 11, via input register 12, the condition of the trunk circuit (free or busy) which is being scanned. Wires $7_0$ to $7_{19}$ are scanned by means of an address decoder 17 and a set of switching AND gates $22_0$ to $22_{19}$. These AND gates have an input connected to respectively wires $7_0$ to $7_{19}$ and a second input connected to respectively the output terminals of decoder 17. The outputs of AND gates $22_0$ to $22_{19}$ are connected in parallel to respectively the first inputs of a set of five AND gates $23_0$ to $23_4$. The outputs of said gates $23_0$ to $23_4$ are connected respectively to multifrequency signalling receivers $18_0$ to $18_4$. These MF receivers are connected to a priority circuit 16 by individual wires conveying signals significative of the condition (idle or engaged) of the MF receivers concerned. When several MF receivers are simultaneously idle, one of them is selected by the priority circuit. For this purpose, the priority circuit 16 is connected by individual wires to the second inputs of AND gates $23_0$–$23_4$.

The outputs of the MF signalling receivers $18_0$–$18_4$ are respectively connected through AND gates to a code converter 19 which converts the "2 out of 6" code used in the MF signalling receivers to the conventional binary code. Two I/O (input-output) storage access controllers 20 and 21 are inserted, the first 20 between multifrequency receivers $18_0$–$18_4$ and processor 11 and the second 21 between processor 11 and paper-tape punch 14.

How to connect an output device such as 14 or an input device such as 19 to the computer storage of a computer unit through I/O storage access controllers is known in the art and is for example described in the textbook "Digital Computer System Principles" by Herbert Hellerman, McGraw-Hill Book Company, 1967, page 124, paragraphs 3–4 and FIGS. 3.4.1.

The processor 11 (FIG. 6) includes twenty memory registers $110_0$ to $110_{19}$ storing words that are respectively assigned to the twenty trunks, $1_0$ to $1_{19}$, as well as other circuits which will be described further on. It operates with a cycle of 10 ms and includes several programming phases. In the case of the decimal pulse code signalling call, the signalling signals are picked up only from the signalling wires. The program includes the following phases:

1 — Scanning, at 10 ms increment, of the twenty trunks and sampling of the pulse code signals conveyed therein;

2 — Reception of the sampled decimal code pulses;

3 — Processing of the twenty registers $110_0$ to $110_{19}$;

4 — Transfer in buffer memory of the register contents related to terminated calls;

5 — Output of the register contents toward paper-tape punch 14 or any other peripheral output unit.

In the case of a multifrequency code call, the signalling signals are picked up from both wires T and R on which is conveyed the signalling part in pulse code, and from the two or four speech path wires on which is conveyed the multifrequency signalling. The program includes the following phases:

1', 2' — Phases 1 and 2, as above;

3' — Connection of a multifrequency receiver $18_0$–$18_4$;

4' — Reception of MF signals;

5' — Disconnection of the engaged multifrequency receiver;

6' — Transfer in buffer memory of the register contents related to terminated calls;

7' — Output of the register contents toward paper-tape punch 14 or any other peripheral output unit.

Except for phases 1 and 2, 1' and 2' which are process recursive, the programming can be interrupted.

Line sequential scanners, such as scanner 15, are known in the prior art. From processor 11 they receive by means of the output register 13, and in sequence, five-bit addresses, each defining one of the twenty trunks $1_0$ to $1_{19}$ scan, and sample at a 100 Hz frequency the pulses transmitted by the T or R wires. These pulses are of different polarities depending on whether they are picked up from wire T or from wire R. They are two-bit coded by line scanner 15 and are transmitted from it to input register 12 wherefrom they enter into processor 11. The first bit relates to signalling over wire T and the second bit relates to signalling over wire R.

Processor 11 includes in addition to registers $110_0$ to $110_{19}$, mentioned previously, a programmer 111, a sample counter 112, a time base 113, a clock 114, a trunk address register 115, a dialling and called subscriber answering detector 116, a transmission-reception flipflop 117, and flipflops 118, 118' of present and past signalling samples connected to a comparator 119. Processor 11 also includes various AND and OR gates, and these will be discussed in the section on operations.

One or the other of the two-bit coded samples transmitted by trunk circuit scanner 15 is applied to flipflop 118, depending on whether transmission-reception flipflop 117 is in the transmit or receive position and that, as a consequence, one or the other of AND gates 1100 or 1101 is open. The state of flipflop 118 is compared to the state of flipflop 118' which contains the bit of the preceding sample in comparator 119. If there is a change in condition from 0 to 1, the comparator 19 opens the AND gate 1102 for access to sample counter 112 and, if there is such change in condition from 1 to 0, the comparator stops the counter.

Therefore, counter 112 counts the samples of the bits 1 emitted by the scanner 15 at the frequency of 100 Hz. Depending on its contents, the counter selectively applies signals to (i) its output 50 ms when its count is centered on 50, say is comprised between 45 and 55, (ii) its output 100 ms when its count is centered on 100, say comprised between 90 and 110, and (iii) output 500 ms when its count is centered on 500, say comprised between 450 and 550.

The outputs 50 ms and 100 ms of counter 112 are connected to dialling and called subscriber answering detector 116 through AND-gate 1110 controlled by programmer 111. The output 100 ms is also connected to wire 1104 through AND-gate 1103 and to wire 1106 through AND-gate 1105, these two AND-gates being controlled by transmission-reception flipflop 117. The output 500 ms is connected to wire 1117 through AND-gate 1107 controlled by transmission-reception flipflop 117.

The times of occurrence of the signals on wires 1104, 1106, 1117 are respectively the instants $H_0$, $H_1$ and $H_3$, and $H_4$ referred to a decimal pulse signalling call and respectively the instants $H_0$ and the instant corresponding to the signalling code change, the instants $H_3$ and $H_4$ referred to a multifrequency signalling call. These signals are applied to programmer 111 to work out the next programming phase and, moreover, open through OR gate 1116 the AND gate 1108 connecting the clock 114 to registers $110_0$ to $110_{19}$. These registers are sequentially activated by trunk address register 115 controlled by time base 113, such address register sequentially opening AND gates $1109_0$ to $1109_{19}$. Thus, the five instants $H_0$, $H_1$, $H_2$, $H_3$ and $H_4$ are inscribed in the register words. Before the conversation beginning instant for a decimal pulse signalling call, the signals generated by counter 112, and corresponding to 50 ms pulses or 100 ms pulses, are transferred into the dialling and called subscriber answering detector 116 through AND gate 1110 open by the programmer. Detector 116 produces (i) the number of the called party on wires 1111 corresponding to a pulse train of 50 ms each, 105, (ii) an end-of-dialling signal on wire 1112, (iii) one or two 100 ms pulses on wire 1113 corresponding to pulses 102 or 102'. The third eventual 100 ms pulse corresponding to pulse 103 is received on wire 1106. The number of the called party (i) is inscribed in the register words though AND gates $1114_0$ to $1114_{19}$, controlled by address register 115. The end-of-dialing signal (ii) is applied to programmer 111 for the working out the following phase. Signal (iii) is applied at the same time to the programmer and to the AND gate 1108 to generate the inscription of intant $H_2$ in the register words at the moment that it occurred. This last signal can be composed of two impulses and means are provided to make sure that $H_2$ is not entered twice.

Before the conversation beginning instant for a multifrequency code signalling call, there is the need to connect to the trunk circuit which conveys this call, one of the idle MF receivers $18_0$ to $18_4$ after the pulse train of signalling code change over wire T, the corresponding signal of which is detected by the programmer 111 from the wire 1104. For this purpose, the programmer 111 activates a multifrequency receiver address register 120 which dispatches the three-bit address of such idle receiver to the output register 13 and the priority circuit 16, at the same time that the trunk circuit address register 115 dispatches to this same output register and address decoder 17 the given trunk circuit address, and that the programmer 111 dispatches to address decoder 17 a two-bit order signal, this being a connection order. Address decoder 17 connects the given trunk circuit to the given idle MF register, their respective addresses being applied to address decoder 17 and priority circuit 16.

The given idle MF receiver detects the multifrequency signalling and records, in "2 out of 6" code, the signals that are received, whether these are specific signalling or numbering signals. Each time that a MF receiver has received a digit, it activates the storage access controller 20 and the programmer controls the transfer of the same data as previously indicated to the output register 13: trunk circuit address, multifrequency receiver address, order signal, the latter being this time a transfer order of the detected digit from the multifrequency receiver to the input register 12 and beyond that to a multifrequency signalling and numbering register 121 of processor 11. During this transfer, the code converter 19 translates digits in "2 out of 6" code into binary coded decimal digits. The multifrequency signalling and numbering register 121 is connected to MF table memory 122 containing the data shown on Table II above via an AND gate 1115 and MF table memory 122 receives as an address the MF signalling and numbering code Co from programmer 111 and the MF digit n from MF signalling and numbering register 121. It outputs the information stored at said address, namely the awaited code Co' and the number N of digits in the latter code. The awaited code is sent to programmer 111 and the digit number N is sent to down counter 123.

As soon as a multifrequency receiver is connected to a trunk circuit, the programmer 111 sets memory 122 on code A. The register 121 receives the digit n of code Co=A, starting with n = 1 or 2, and transmits it on the one hand as an address to the memory 122 and on the other hand to down counter 123. If n = 1, memory 122 dispatches $C_0' = a$ to programmer 11 and the data $N = 1$ to down counter 123. If n = 2, memory 122 dispatches $C_0' = b$ to programmer 111, and data $N = 2, 3$ or 4, and so on, to the down-counter 123. For each digit received by the register 121, the down-counter advances by one step. Memory 122 does not accept a new address from register 121 unless the down-counter 123 is set at zero (AND gate 1115). It is seen that down-counter 123 is set by MF table memory 122 and is decremented by register 121. When down-counter 123 is empty, it is because the digit which has just been received from register 121 is the last multifrequency signalling digit. The null value contained in down-counter 123 is detected by a zero detector 124 which transmits a signal to programmer 111. The latter in turn dispatches the disconnect order to the given MF receiver.

Circuits 122 and 124 are linked to OR GATE 1116 for the purpose of controlling the entry of instants $H_1$ and $H_2$. Then the programmer 111 receives a corresponding eventual signal to the pulse 103 on wire 1106 and operates as with a decimal pulse code call.

Figure 6:
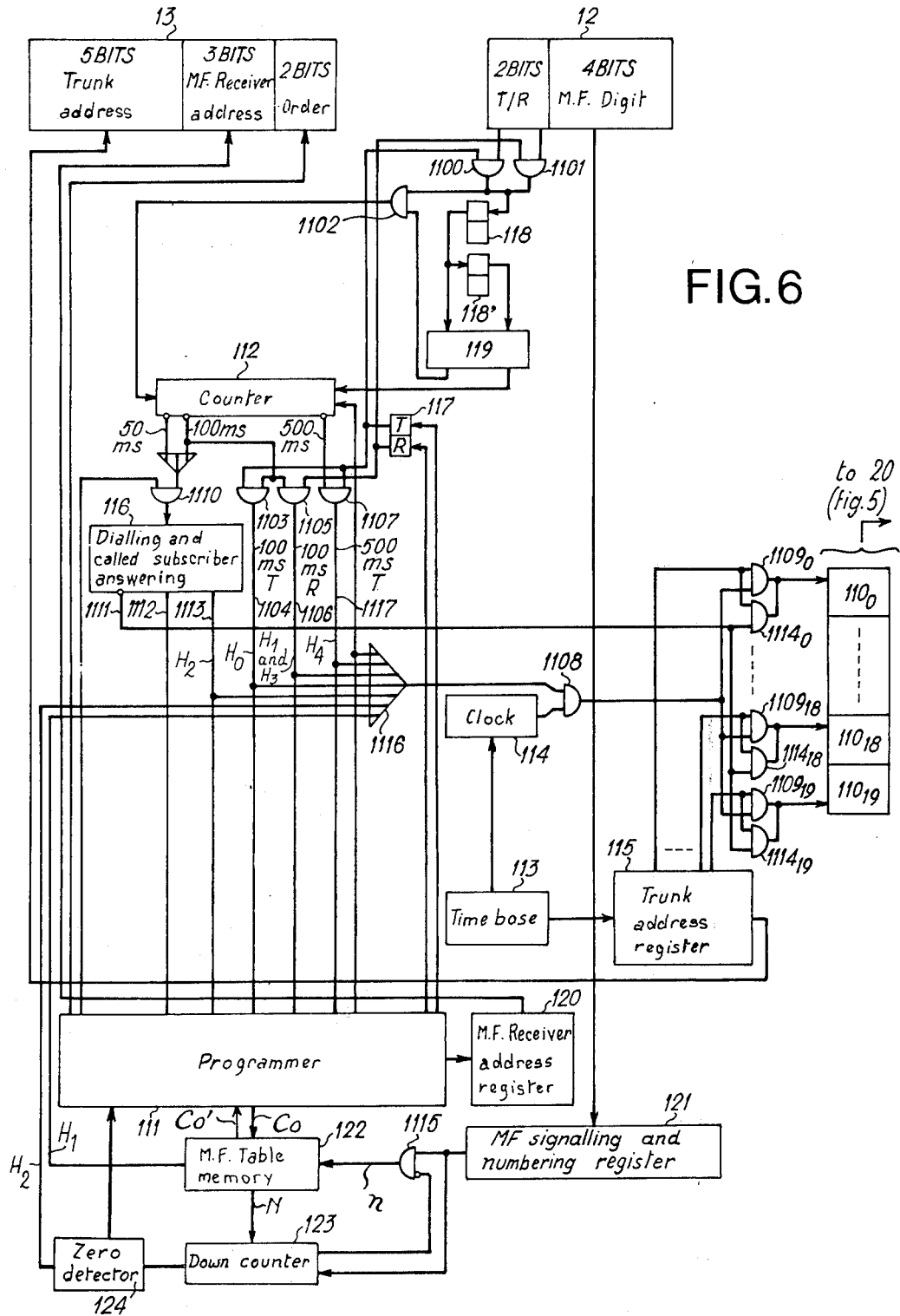
FIG. 6 is a block diagram of the traffic analyzer processor.

In FIG. 6, processor 11 of FIG. 5 is split into component circuits 111 to 124. The functions of circuits 112 to 123 have been disclosed specifically. As for programmer 111, it is a conventional program counter which passes from a former instruction to the following instruction at the completion of the former instruction. Program counters are well known in the prior art and are for example disclosed at pages 358–363 of the textbook "Digital Electronics for Scientists" by H. V. Malinstadt and C. G. Enke, W. A. Benjamin, Inc. Publishers, 1969. The essential function of a program counter is to control the opening or closing of gates between an information source and an utilization circuit, for example gates inserted between the trunk address register 115, the MF receiver address register 120 and a connection or disconnection signal source and output register 13.

The operation of the traffic analyzer can be summarized as follows:

The connecting time of a multifrequency receiver is easy to know, since it follows by a given delay a decimal code signal easy to detect. This signal has been called "signalling code change signal".

Contrarily, the disconnecting time is difficult to determine since it depends on the number of digits of a particular code. The first digit received pertains to a given code, always the same, code A. But, depending upon the value of the digits of the code, the next code $C_o'$ can be code A, B, a or b. Depending upon what code is the next code, the number of digits in said code is different. Consequently, at the address ($C_0$, n) of memory 122, there is written the next code $C_o'$ and its number of digits N. Number N is transferred to down-counter 123, then down-counter 123 is decremented by the digits of code $C_o'$. When 123 is empty, which is detected by zero sensor 124, it is the time $H_2$ for disconnecting the multifrequency receiver. We claim:

1. A traffic analyzer in combination with a group of trunk circuits having transmission and reception lines including a bidirectional speech path and a supervisory signalling path connecting two telephone exchanges, each exchange comprising:

decimal code signalling means for conveying decimal code signals over said supervisory signalling path of each trunk circuit;

multifrequency code signalling means for feeding said bidirectional speech path of said trunk circuits with code speech digital signals; and;

said decimal code signals and multifrequency signalling code digits providing pluralities of decimal signalling code signal sequences and multifrequency signalling code digit sequences;

the sequences of decimal code signals being composed of different signals unambiguously defining certain phases of a telephone call and comprising a signalling code change signal and the sequences of multifrequency code digits being catenated sequences defining certain other phases of a telephone call and being composed of a number of multifrequency code digits variable according to the phases they define;

said traffic analyzer comprising means for cyclically sampling said decimal signalling code signals;

means for connecting said sampling means to said transmission and reception lines of said trunk circuits;

means controlled by said sampling means for sensing said signalling code change signal;

a number of multifrequency signalling receivers which are smaller than the number of trunk circuits in said group;

said receivers detecting said multifrequency signalling code digits;

means controlled by said signalling code change signal sensing means for connecting a multifrequency signalling receiver to said bidirectional speech path of a trunk circuit;

a memory having recorded therein at addresses formed by the digits of a given multifrequency code digit sequence which are detected by said multifrequency signalling receiver, the number of digits of a following multifrequency code digit sequence being catenated with said given sequence;

a counter;

means for transferring from said memory to said counter said number of digits of said following sequence;

means for decrementing said counter by the multifrequency digits detected by said connected multifrequency signalling receiver and for transmitting said addresses to said memory which are connected to said multifrequency signalling receivers;

means for sensing the count zero in said counter and means controlled by said count zero sensing means for disconnecting said connected multifrequency signalling receiver.

2. A traffic analyzer in combination with a group of trunk circuits having transmission and reception lines including a bidirectional speech path and a supervisory signalling path connecting two telephone exchanges, each telephone exchange comprising:

decimal code signalling means for conveying decimal code signals over said supervisory signalling path of each trunk circuit;

multifrequency code signalling means for feeding said bidirectional speech path of said trunk circuits with code speech digital signals; and;

said decimal code signals and multifrequency signalling code digits providing pluralities of decimal signalling code signal sequences and multifrequency signalling code digit sequences;

the sequences of decimal code signals being composed of different signals unambiguously defining certain phases of a telephone call and comprising a signalling code change signal and the sequences of multifrequency code digits being catenated sequences defining certain other phases of a telephone call and being composed of a number of multifrequency code digits variable according to the phases they define;

said traffic analyzer comprising means for cyclically sampling said decimal signalling code signals;

means for connecting said sampling means to said transmission and reception lines of said trunk circuits;

means controlled by said sampling means for sensing said signalling code change signal;

a number of multifrequency signalling receivers which are smaller than the number of trunk circuits in said group;

said receivers detecting said multifrequency signalling code digits;

a switching network having inputs connected to said bidirectional speech path of each said trunk circuit and outputs connected to said multifrequency signalling receivers;

means controlled by said signalling code change signal sensing means for selectively operating said switching network, thereby connecting a multifrequency signalling receiver to a trunk circuit;

a memory having recorded therein at addresses formed by the digits of a given multifrequency code digit sequence which are detected by said multifrequency signalling receiver, the number of digits of a following multifrequency code digit sequence catenated with said given sequence;

a counter;

means for transferring from said memory to said counter said number of digits of said following sequence;

means for decrementing said counter by the multifrequency digits detected by said connected multifrequency signalling receiver and for transmitting said addresses to said memory which are connected to said multifrequency signalling receiver via said switching network;

means for sensing the count zero in said counter and means controlled by said count zero sensing means for disconnecting said connected multifrequency receiver.

3. A traffic analyzer in combination with a group of trunk circuits having transmission and reception lines including a bidirectional speech path and a supervisory signalling path connecting an originating exchange to a terminating exchange, each telephone exchange comprising:

decimal code signalling means for conveying decimal code signals over said supervisory signalling path of each trunk circuit;

multifrequency code signalling means for feeding said bidirectional speech path of said trunk circuits with code speech digital signals; and;

said decimal code signals and multifrequency signalling code digits providing pluralities of decimal signalling code signal sequences and multifrequency signalling code digit sequences;

the sequences of decimal code signals being composed of different signals comprising a signalling code change signal and unambiguously defining the phase of a telephone call including seizing of the terminating exchange by the originating exchange, called subscriber answering and call release and the sequence of multifrequency code digits being catenated sequences defining other phases of a telephone call including order of dialling given from said terminating exchange to said originating exchange and dialling in said originating exchange, and being composed of a number of multifrequency code digits variable according to the phases they define;

said traffic analyzer comprising means for cyclically sampling said decimal signalling code signals;

means for connecting said sampling means to said transmission and reception lines of said trunk circuits;

means controlled by said sampling means for sensing said signalling code change signal;

a number of multifrequency signalling receivers smaller than the number of circuits in said group;

said receivers detecting said multifrequency signalling code digits;

means controlled by said signalling code change signal sensing means for connecting a multifrequency signalling receiver to said bidirectional speech path of a trunk circuit, a memory having recorded therein at addresses formed by the digits of a given frequency code digit sequence which are detected by said multifrequency signalling receiver, the number of digits of a following multifrequency code digit sequence catenated with said given sequence, a counter;

means for transferring from said memory to said counter said number of digits of said following sequence;

means for decrementing said counter by the multifrequency digits detected by said connected multifrequency signalling receiver and for transmitting said addresses to said memory which are connected to said multifrequency signalling receivers;

means for sensing the count zero in said counter and means controlled by said count zero sensing means for disconnecting said connected multifrequency signalling receiver.

* * * * *